May 19, 1936.  M. GAULTIER  2,041,539

VALVE SPRING ARRANGEMENT

Filed Jan. 27, 1933    2 Sheets-Sheet 1

INVENTOR:
MAURICE GAULTIER
BY: Francis E. Boyer
ATTORNEY

May 19, 1936. M. GAULTIER 2,041,539
VALVE SPRING ARRANGEMENT
Filed Jan. 27, 1933  2 Sheets-Sheet 2
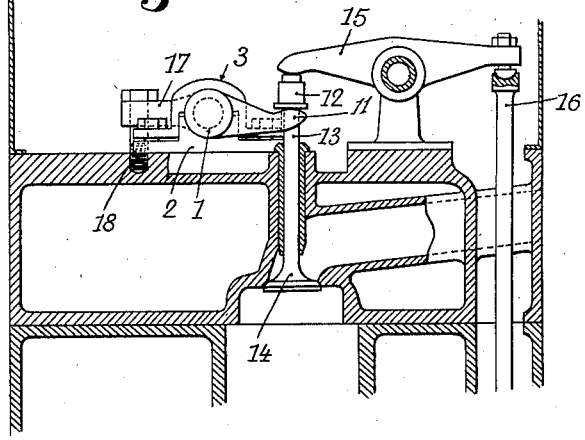
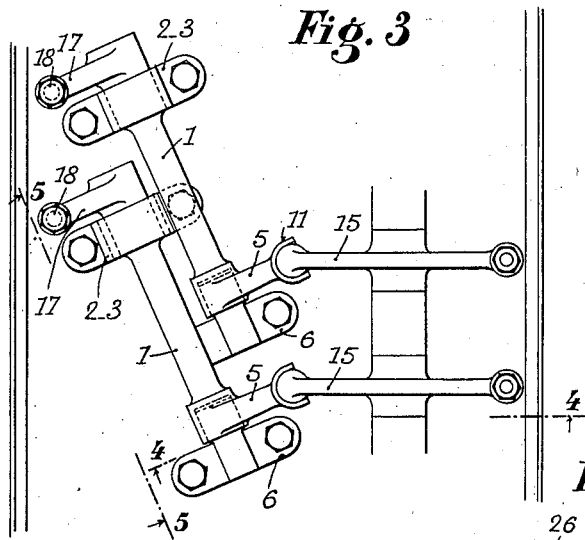
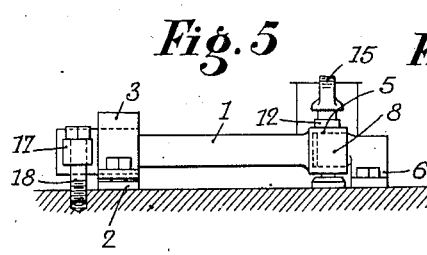
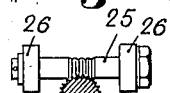
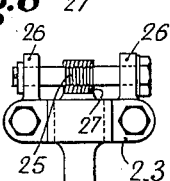
INVENTOR:
MAURICE GAULTIER
BY: Francis L. Boyce
ATTORNEY Patented May 19, 1936

2,041,539

UNITED STATES PATENT OFFICE 2,041,539

VALVE SPRING ARRANGEMENT

Maurice Gaultier, Carrieres-sur-Seine, France, assignor to Delage & Cie, Paris France Application January 27, 1933, Serial No. 653,836
In France December 6, 1932

12 Claims. (Cl. 123—90)

The present invention relates to an elastic member which is chiefly useful for the control of devices having a reciprocating motion of high frequency, such as the valves of internal combustion engines.

It is well known that the deformation of a helical spring is an undulatory phenomenon, and that the speed of propagation of the deformation depends upon the characteristics of the spring. In the particular case of the control of valve gear in internal combustion engines, the selection of the proper return springs for the valves is determined by the following factors: length of the spring wire; speed of propagation of the disturbances in the spring; and shape of the control cam. Each of these factors has a limit value which cannot be exceeded in practice. Thus, the length of the spring wire is limited by the minimum flexibility of the spring. On the other hand, this length should be compatible with the bulk manufacture of springs; the variations of the length of the springs, which are inevitable in bulk manufacture, will cause differences in the characteristics of the springs, which are greater as the spring is shorter. On the other hand, the rate of propagation of the disturbances is limited by the winding of the spring. Finally, the shape of the cam is determined by the degree of filling of the cylinder. Even when selecting the optimum value of these three variable factors, the maximum speed of the camshaft must be kept relatively low.

The invention has for its object to devise a spring member whose adaptation to the control of valve gear of internal combustion engines permits of greatly increasing the upper limit of speed of the camshaft; in a broader aspect of the invention, I aim to provide a spring member for the control of reciprocating motions of a much greater frequency than is allowed by the known helical springs.

The elastic member according to the invention consists of a rectilinear bar of an elastic metal, adapted to work by torsion and which is provided with a lateral projection connected with the member to be controlled.

This spring member operates after the manner of a bar fixed or clamped at one end and subjected to torsion, and both theory and experience show that the rate of propagation of disturbances in such a rectilinear bar is much greater than in a helical spring of equivalent elastic properties. On the other hand, such a bar can be trimmed with all desired precision, and hence it may be calculated with a much greater degree of accuracy than a helical spring.

In one embodiment of the invention, the rectilinear bar may comprise, at the end opposite the one carrying the aforesaid lateral projection, a suitable adjusting means adapted to produce a certain initial torsion in the rectilinear bar; clamping means are preferably mounted adjacent said torsion adjusting means, in order to relieve this latter from stresses during the operation, after the initial torsion adjustment has been made.

The invention further relates to the application of this device to the valve control of internal combustion engines and, in this embodiment of the invention, said lateral projection consists of an arm ending in a fork engaging a shoulder of the valve stem.

If desired, a motion reducing arrangement may be interposed between the elastic member and the valve or other element under control, in order to reduce the deformations of the elastic member, substantially as described in U. S. Patent No. 1,902,696 granted on March 21, 1933 to E. Eimer.

The accompanying drawings show by way of example various embodiments of the invention.

Fig. 3 is a plan view showing the application of the invention to the valve gear of an internal combustion engine.

Fig. 4 is a developed cross-section on the line 4—4 of Fig. 3.

Fig. 5 is an elevational view on the line 5—5 of Fig. 3.

Fig. 8 is an end view corresponding to Fig. 3, showing a modified tension adjusting device, and Fig. 9 is a corresponding partial plan view.

Figure 1:
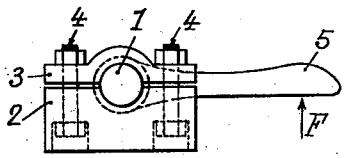
Fig. 1 is an end view of an elastic member according to the invention.

The elastic member according to the invention essentially consists of a rectilinear bar 1 of elastic metal, adapted to work by torsion. For this purpose said bar may be held at one end between two jaws or clamps 2—3 by means of bolts 4, the other end of the bar having a lateral projection, such as an arm 5 to which is imparted a force F, for instance the elastic reaction of a controlled element having a reciprocating motion at a high frequency. The bar 1 can be supported at a point near the arm 5 by means of a trunnion 8 rigidly secured to a support 6 and engaging a recess at the enlarged end of bar 1. The bearing portion 7 may have a larger cross-section than the stem portion of bar 1 and both said bearing portion and the enlarged end of the bar integral with arm 5 may be connected with the stem portion of bar 1 by curved surfaces 9 and 10. The stem portion of bar 1, which is subjected to torsion, may thus be given a well-defined length $l$ and its cross-sectional area can be trimmed with all desired accuracy, which will permit to calculate very closely the characteristics of the elastic member by applying the usual formulae for a piece rigidly clamped at one end and subjected to torsion.

For example, I use a bar of nickel-chromium steel having a mechanical strength of 120 kgs. per sq. mm. which will be subjected in practice to a maximum stress of 40 kgs. per sq. mm. The rate of propagation of disturbances in such a straight bar is very high, which permits of controlling reciprocating movements having a much higher frequency than it is possible in the case of helical springs.

Figure 2:
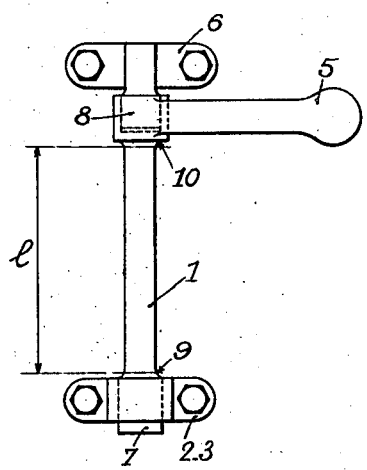
Fig. 2 is a corresponding plan view.

For this reason, the invention is particularly useful for the control of the valve gear of internal combustion engines operating at high speeds. Figs. 3 to 5 show an embodiment of the invention in this particular case, and the reference numerals correspond to those of Figs. 1 and 2. The arm 5 of the elastic member ends in a fork 11 engaging the lower face of a shoulder 12 of the stem 13 of a valve 14, said valve being controlled for instance by a rocker arm 15, actuated by a rod 16, co-operating with the cam of the valve gear, in the usual manner.

To provide for the use of bars of sufficient length, while assuring the control of a certain number of similar rocker arms 15, the bars can be given a certain inclination with reference to the longitudinal axis of the engine, as shown in Fig. 3.

In order to provide the reaction force necessary to close the valve, when the bar is idle, bar 1 is given a certain initial torsion, by providing the end of bar 1, opposite arm 5, with an arm 17 loosely traversed by a screw 18, screwing in the cylinder head and adapted to adjust the said initial torsion. During this adjustment the clamps 2—3 are released and they are tightened when the initial adjustment has been made, thus relieving screw 18 and obviating all bending stress in bar 1.

Other adjusting means may obviously be employed, for instance a transverse screw 25 (Fig. 9) mounted in lugs 26 of clamping member 3, and engaging a worm 27 formed at the end of bar 1.

Due to the properties of the elastic member according to the invention, and to the possibility of a very accurate trimming, it is possible to accurately control the operation of the valve gear for very high speeds of the camshaft, and use may be made of a cam outline which is more advantageous for the complete filling of the cylinders.

Figure 6:
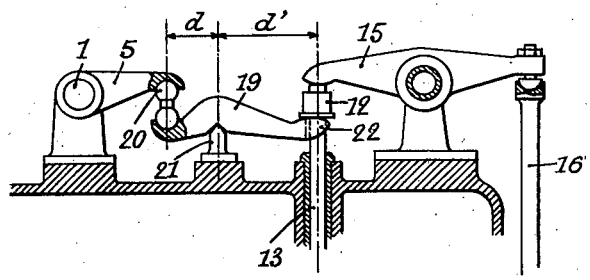
Figs. 6 and 7 are views similar to Fig. 4, showing respectively two modifications in which a motion reducing device is interposed between the elastic member and the valve or other controlled element.
Figure 7:
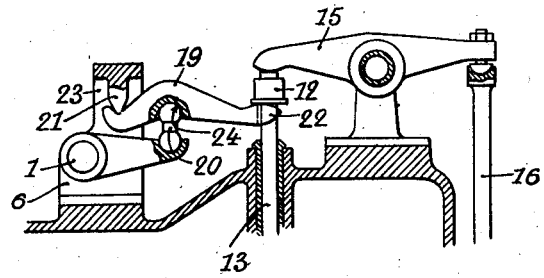

If necessary, the deformation of the elastic member may be reduced to any suitable extent especially when it is desired to employ a bar of short length, while obtaining the same elastic force; this may be done by interposing between the elastic member and the valve or other part to me controlled, a motion reducing device, such as an intermediate lever, as shown in Figs. 6 and 7. In Fig. 6, the arm 5 of bar 1 is connected with an intermediate lever 19 by a small link 20 connected to arm 5 and lever 19 by ball-and-socket joints; lever 19 is pivoted on a knife-edge 21, and its forked end 22 is engaged under the shoulder 12 of valve stem 13. The proper speed reduction is obtained by suitably proportioning the leverages $d\ d'$ of lever 19.

In the arrangement shown in Fig. 7, the point of application of the elastic force is located between the point of support and the point of resistance. For this purpose the knife-edge 21 is mounted on a support 23, secured to member 6 (Fig. 2 or 3) and lever 19 has a spherical recess 24 adapted to receive the ball-shaped end of the small link 20, connected with arm 5 by a ball-and-socket joint. Obviously, the invention is not strictly limited to the details of construction hereinbefore described, and these may be variously modified without departing from the principle of the invention.

Having now described my invention what I claim as new and desire to secure by Letters Patent is:

1. In a valve control gear for internal combustion engine, a plurality of valves, aligned in a direction parallel with the longitudinal axis of the engine, control means and a return spring member for each valve, said return spring member comprising a rectilinear bar of elastic metal, means for clamping one end of said bar, a lateral projection at the opposite end of said bar, operatively connected with said valve, and means for imparting an initial torsion to said bar, the axes of said bars being parallel and inclined with respect to said longitudinal axis.

2. A valve spring arrangement for valve gears of internal combustion engines, which comprises a torsion bar provided with a lateral projection adapted to be connected with the valve to be controlled and means for clamping said bar at a distance from said projection.

3. A valve spring arrangement as claimed in claim 2 further comprising means affording initial adjustment of the torsion of said bar and means whereby the clamping action of said clamping means may be released during torsion adjustment.

4. A valve spring arrangement according to claim 2 wherein said bar is formed of parallel rectilinear fibres.

5. A valve spring arrangement for valve gears of internal combustion engines, which comprises a torsion bar having a rectilinear stem portion of uniform section throughout its length and two enlarged ends connected with said stem portion by curved surfaces, clamping means for securing one end against torsion, means for rotatably supporting the opposite end and a lateral projection at said opposite end, adapted to be connected with the valve to be controlled.

6. A valve spring arrangement as claimed in claim 5, wherein said opposite end of said bar is formed with a cylindrical bore, said supporting means engaging said bore.

7. A valve spring arrangement as claimed in claim 5 wherein said projection ends in a fork adapted to straddle the stem of the valve to be controlled.

8. A valve spring arrangement for valve gears of internal combustion engines, which comprises a torsion bar provided with a lateral projection adapted to be connected with the valve to be controlled, means for clamping said bar at a distance from said projection, a fixed support for said clamping means, a second lateral projection near said clamping means, a screw loosely extending through said second projection and screwing into said support for initial adjustment of the torsion of said bar, and means whereby the clamping action of said clamping means may be released during torsion adjustment.

9. A valve spring arrangement for valve gears of internal combustion engines, which comprises a torsion bar provided with a lateral projection adapted to be connected with the valve to be controlled, means for clamping said bar at a distance from said projection, an endless screw rotatably supported by said clamping means, a helical toothing formed in said bar and engaging said endless screw, for initial adjustment of the torsion of said bar, and means whereby the clamping action of said clamping means may be released during torsion adjustment.

10. In a valve spring arrangement for internal combustion engines, a plurality of valves, aligned in a direction parallel with the longitudinal axis of the engine, and a return spring member for each valve comprising a rectilinear bar of elastic metal, means for clamping one end of said bar, a lateral projection at the opposite end of said bar, operatively connected with said valve, and means for imparting an initial torsion to said bar, the axes of said bar being parallel and inclined with respect to said longitudinal axis.

11. In a valve control gear for internal combustion engine, a valve, control means for said valve, a return spring member comprising a rectilinear bar of elastic metal, means for clamping one end of said bar, a lateral projection at the opposite end of said bar, operatively connected with said valve, and means for imparting an initial torsion to said bar, said projection ending in a fork straddling the stem of said valve and engaging a shoulder thereof.

12. In a valve control gear for internal combustion engine, a valve, control means for said valve, a return spring member comprising a rectilinear bar of elastic metal, means for clamping one end of said bar, a lateral projection at the opposite end of said bar, operatively connected with said valve, means for imparting an initial torsion to said bar, and a motion reducing device between said valve and projection.

MAURICE GAULTIER.